United States Patent [19]

Cushing

[11] Patent Number: 5,467,650
[45] Date of Patent: Nov. 21, 1995

[54] OPEN CHANNEL FLOWMETER

[76] Inventor: Vincent J. Cushing, 153 Williams Dr., Annapolis, Md. 21401

[21] Appl. No.: 841,885

[22] Filed: Feb. 25, 1992

Related U.S. Application Data

[63] Continuation-in-part of Ser. No. 747,431, Aug. 13, 1991, which is a continuation of Ser. No. 478,872, Feb. 12, 1990, abandoned.

[51] Int. Cl.$^6$ .................................................. G01F 7/00
[52] U.S. Cl. ................... 73/215; 73/198; 73/861; 73/204.18; 73/227; 364/510
[58] Field of Search ................ 73/215, 198, 861, 73/204.18, 227; 364/510

[56] References Cited

U.S. PATENT DOCUMENTS

| | | | |
|---|---|---|---|
| 3,220,225 | 11/1965 | Scranton et al. | 73/204.18 |
| 3,363,462 | 1/1968 | Sabin | 73/204.18 X |
| 3,996,798 | 12/1976 | Vander Heyden | 73/215 |
| 4,083,246 | 4/1978 | Marsh | 73/227 |
| 4,397,191 | 8/1983 | Forden | 73/227 X |
| 4,437,339 | 3/1984 | Drews et al. | 73/204.18 X |
| 4,467,644 | 8/1984 | Palmer | 73/198 |
| 4,480,466 | 11/1984 | Gates | 73/215 |

*Primary Examiner*—Richard Chilcot
*Assistant Examiner*—Jewel V. Artis
*Attorney, Agent, or Firm*—Sughrue, Mion, Zinn, Macpeak & Seas

[57] ABSTRACT

A flowmeter for measuring the volumetric discharge in an open channel makes two measurements: (1) velocity at a fixed point, and (2) fluid level. A level-discharge function which is a function of level alone is then generated in response to the measured level, and the discharge function and velocity measurement are multiplied to obtain the volumetric discharge. For more accuracy, in a conduit through which fluid is flowing, a single velocity measurement at a point has a value $v_s$, from which is inferred the effects of velocity profile in the conduit. A flowmeter in a second embodiment makes use of this such that a level-velocity-discharge function directly produces the volumetric discharge, using inputs from the velocity and level signals. In a third embodiment, when the conduit is full, the level measurement is dispensed with, and a velocity-discharge function directly produces the volumetric discharge, using input from the velocity sensor.

22 Claims, 5 Drawing Sheets

OPEN CHANNEL FLOWMETER

This application is a continuation-in-part of application Ser. No. 07/747,431 filed Aug. 13, 1991, which is a continuation of application Ser. No. 07/478,872 entitled "Open-Channel Flowmeter" and filed Feb. 12, 1990, now abandoned.

The present invention is directed to determination of discharge (volumetric flowrate) in a conduit, using a sensor which measures flow velocity in the neighborhood of a point, and applies a factor to this single velocity to compensate for velocity profile. In less than full pipes or other open channels, an auxiliary measurement is also made of the level of the metered fluid level.

Fluid flowing in conduits—whether pressure flow (full pipe) or open channel—has a velocity profile owing to wall friction and fluid viscosity. Although the invention measures fluid velocity in the neighborhood of a point, the invented instrument provides a means of compensating for velocity profile in order to yield discharge.

The velocity-area method [Grover, N. C, and A. W. Harrington, "Stream Flow,", Wiley New York, 1943] is the regular method for determining flow in an open channel, where vertical and horizontal traverses are made with a velocity meter.

Discharge through open channels can be inferred by measurement of fluid level alone, provided a control channel such as a weir or flume is employed. However, if there are backflow conditions (e.g., where fluid level is partially determined by tides) measurement based on a level alone device is not suitable.

A next step is to augment the level measurement with a single velocity measurement somewhere in the stream. It is then possible to employ the device—in both open channels and full conduits—in channels without necessity for weirs or curved boundaries as in flumes.

P. W. Strilaeff ["Single Velocity Method in Measuring Discharge," Proc. Intl. Seminar on Water Resources Instrumentation, Intl Water Res. Assoc., Chicago, Ill. (1974)] describes the use of a measurement of single velocity, $v_s$, in a stream as a means of inferring the discharge Q of the stream. He exploits the definition of mean velocity $V_m$ $$V_m = Q/A \qquad (1)$$

where A is the cross-sectional area of the channel. Strilaeff states that the single velocity method of measuring discharge requires three parameters: (1) a single velocity observation $v_s$, (2) cross-sectional area A at the time of velocity observation, and (3) a coefficient of relationship k between actual discharge and the product of the above two parameters.

Strilaeff defines the coefficient of relationship k by $$k = \frac{Q}{A \cdot v_s} \qquad (2)$$

To determine a k table for a given stream, Strilaeff measures stream level y, single velocity $v_s$, and discharge Q using the regular velocity-area method. He then ascertains channel area A from a level-area curve or table, acquired by standard means. He then tabulates the coefficient of relationship k.

Thereafter, Strilaeff determines stream discharge Q by measuring stream level y and single velocity $v_s$. He then determines channel area A from the level-area curve or table, and determines k from the tabulation. Discharge Q is determined by rearrangement of equation (2):

$$Q = A \cdot v_s \cdot k. \qquad (3)$$

Figure 1:
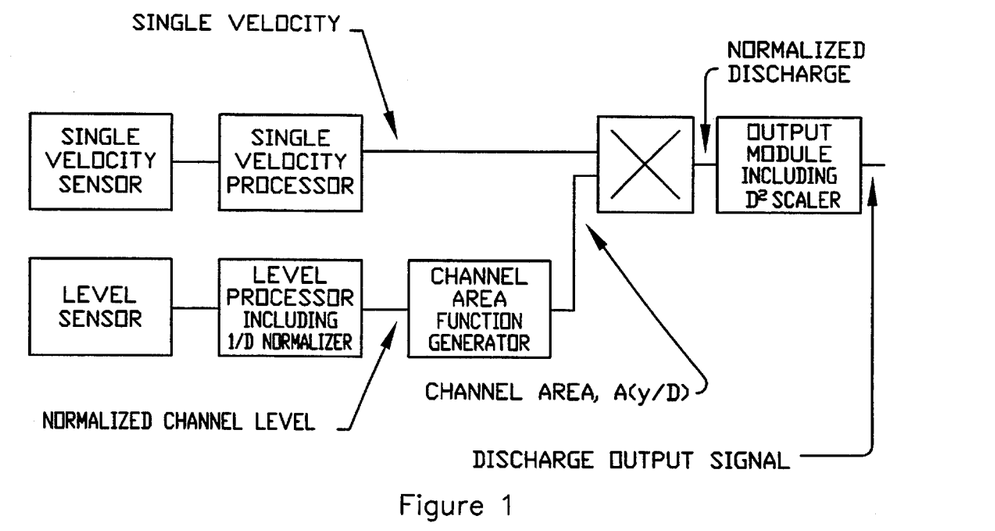
FIG. 1 is a block diagram of a prior art single velocity open-channel flowmeter.

FIG. 1 shows a block diagram of an open-channel flowmeter previously manufactured by the present inventor, where the velocity sensor was positioned to measure velocity at a fixed elevation above the channel bottom and the single velocity $v_s$ was multiplied by A(y)—a function of water level y alone, as measured by a separate level gauge. Appropriate scalar multipliers were included to accommodate different sizes of open-channel. The function generator of this product was programmed to account for the area information only.

Figure 2:
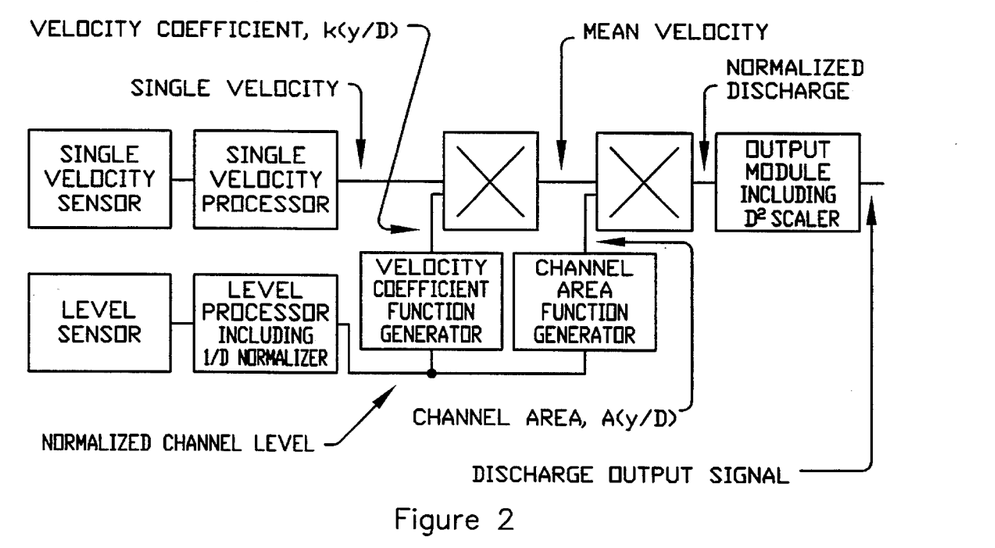
FIG. 2 is a block diagram of a further prior art single velocity open-channel flowmeter.

U.S. Pat. No. 4,083,246 to Marsh also exploits the definition of mean velocity $V_m$ as used in equation (1). The device disclosed by Marsh is shown in FIG. 2 herein. To measure discharge Q, Marsh (1) measures $v_s$; (2) measures the water level y; (3) uses a first (velocity coefficient) function generator to form k(y); (4) uses a first multiplier to form the product of $v_s$ and k(y), i.e., to form $V_m = k(y) \cdot v_s$; (5) uses a second (channel area) function generator to form the flow area $A = A(y)$; and (6) uses a second multiplier to form the product of $V_m$ and A, i.e., $Q = V_m \cdot A$. Appropriate scalar multipliers are included to accommodate different sizes of open-channel.

In full conduit flowmetering, extensive use has been made of the pitot tube, which measures velocity at a point in the conduit cross-section. It has been widely used in studies of velocity distribution. For measurement of discharge Q in a pipe, its discharge coefficient C, an empirically determined constant, has been defined [Folsom et al, "Review of the Pitot Tube," Trans ASME, 1447, Oct. 1956] in terms of $$Q = C \cdot A \cdot (V_m/v_s) \cdot v_s \qquad (4)$$

where A is the cross sectional area of the pipe; $V_m$ is mean velocity and $v_s$ is velocity sensed at a point, both determined from a pitot tube traverse. Since the pressure sensed by the pitot tube varies as the square of the velocity, $$v_s = \sqrt{2p} \qquad (5)$$

where p is the dynamic pressure sensed by the pitot tube. (Actually, the expression for velocity requires that 2p be replaced by $2p/\rho$, where $\rho$ is the fluid density; however, in practice that constant—for incompressible flow—is absorbed in the coefficient C.) Folsom, and most others, generally measure $v_s$ on the pipe centerline. For a given installation, the factor $V_m/v_s$ is used as a constant, and the discharge is thereafter inferred as a linear function of $v_s$.

Numachi ["Streamlined Pitot Tube Bar for Measuring Water Flow in Large Pipes," Trans. ASME, 1079, July, 1956] describes a bar placed through a diameter of a round pipe, the leading edge of the bar having several pitot ports distributed across the entire length of the bar, each pitot port having a separate line to enable simultaneous measurement at each of the several ports. The multiport arrangement is tantamount to the regular velocity-area method—using velocity measurement at several different points—described by Grover (above), except the vertical and horizontal traverse is replaced by the equivalent of a radial-azimuthal traverse appropriate to the geometry of the round pipe (with the azimuthal portion of measurements largely assumed, on symmetry grounds).

Plache ["Annular Averaging Applied to Flow Measurement," (proceedings of the FLOW Symposium, Pittsburgh, May, 1971), Part 2, ISA, p. 497, 1974] describes the Annubar, a bar extending across a pipe diameter, with four ports communicating to a common chamber for the purpose of giving a representation of the average velocity of the flowing fluid. The Annubar scheme divides the cross-section into four equal (annuli) areas. The four pitot ports are located—across the diameter of the pipe— at what is described as the average velocity points of the respective annuli. The four pitot port pressures are then averaged in what is described as an interpolating tube, yielding effectively a single average velocity. Plache states the U.S. Patent Office has on record many multi- orificed pitot tube designs, but that none had achieved the highly repeatable discharge coefficient being sought.

None of the foregoing full conduit gauges has utilized the simplicity of measurement of single velocity $v_s$ in the neighborhood of a point and used a function generator or look-up table which: (1) infers discharge Q, while at the same time (2) accounts for velocity profile change as indicated by the value of $v_s$.

Other flowmeters are avowedly full-pipe but nonetheless measure velocity in a neighborhood of a point (albeit a large neighborhood, e.g., having a frontal diameter about half that of the pipe diameter):

(1) Target flowmeter, where the drag force on a plate is proportional to the square of $v_s$. Typical of all head meters, it is not applied where $v_s$ is to low, since its indication falls below the noise level and inaccuracy results.

(2) Vortex meter where shedding frequency is proportional to $v_s$ (above a certain minimum value of Q). In a given application its use is limited to flows above the certain minimum.

As with the pitot tubes described earlier, these meters are calibrated for a given application and used only over the dynamic range where Q is a linear function of $v_s$.

All of the prior art with single velocity measurement obtain indication of velocity $v_s$ on the pipe centerline; or for multi-$v_s$ transducers, measurement is made at points symmetrically straddling the centerline. For large diameter pipes this makes for a difficult installation.

The present inventor in 1975 marketed a velocity meter where a single velocity probe was inserted through a tap in a pipe wall. Recommended insertion depth was such that $v_s$ was measured a distance D/8 from the pipe wall (the so-called wall distance, where D is the pipe diameter). There had been evidence that the ratio of Q/$v_s$ was a constant independent of $v_s$ at that wall distance. This later proved to be an unreliable recommendation, especially for small pipes where there developed hydrodynamic and electromagnetic interference owing to the proximity of the pipe wall or accretions on the pipe wall. As an improvement, $v_s$ measurement was made nearer the pipe centerline, where Q is a nonlinear function of $v_s$ owing to velocity profile changes as a function of Reynolds number. But no effort has been made to correct for such nonlinearity.

Improved accuracy requirements call now for the methods of the present invention in its full pipe embodiment.

Determination of channel flow area A has long been a standard procedure for those doing scientific hydraulics work on velocity profiles in open channels—in order to normalize variables and make the work widely useful in different size scales of channels. This common procedure has needlessly been carried over in prior open channel flowmeters. For actual measurement of discharge in open channels, area determination is (1) unnecessary, and (2) involves procedures which are costly, tedious and often impracticable.

SUMMARY OF THE INVENTION

The present invention is based on the realization that in any given channel, discharge Q is a function of single velocity $v_s$ (measured at some point in the channel) and of fluid level y, i.e., Q= Q(y,$v_s$). The measurement point is preferably restricted to a region where the fluid velocity is substantially different from zero.

A first embodiment of the present invention makes a linear approximation, articulating Q(y,$v_s$) into the product of $v_s$ and f(y), i.e., Q= $v_s$·f(y).

The level-discharge function f(y) is defined by f(y)= Q/$v_s$. For a given channel, a table of f(y) is initially generated from measurements of discharge Q, level y, and single velocity $v_s$ measured at fixed elevation above the channel bottom.

After the table is constructed, stream discharge Q can be determined by measuring level y and single velocity $v_s$. The level-discharge function f(y) is recalled from the table, and is used to calculate Q=f·$v_s$, e.g., in a digital processor. Alternatively, one may use a function generator representing analytical or empirical functions in order to produce substantially the same data contained in the table.

A second embodiment of the invention recognizes that velocity profile depends on Reynolds number of the flow, i.e., effectively depends on $v_s$. Hence an approximation linear in $v_s$ does not give best accuracy. Instead, this embodiment uses a level-velocity-discharge function, embodied in level-velocity-discharge table, representing the form $$Q= f(y,v_s). \quad (6)$$

The level-velocity-discharge function of the second embodiment of the invention can not only compensate for velocity profile in the channel, but can also compensate for nonlinearities in the velocity measuring device itself.

A third embodiment of the invention is applicable when level y reaches its maximum in a closed conduit. Under these conditions, a velocity-discharge function is used which corrects for variation in velocity profile—as a function of single velocity $v_s$—in a full conduit so as to yield discharge Q. Since, in a full conduit, gravity (and the direction of the gravity vector) plays no role in velocity profile, the single velocity measurement neighborhood may be placed virtually arbitrarily within the conduit.

BRIEF DESCRIPTION OF THE DRAWINGS

The invention will be more clearly understood from the following description in conjunction with the accompanying drawings, wherein.

DETAILED DESCRIPTION OF THE INVENTION

To study ways of using a single velocity method, the present inventor has observed that, in any given channel, discharge Q is a function—wishfully theoretical, but empirical in most of the practical instances—of single velocity $v_s$ (measured at some point in the channel) and of fluid level $y$ $$Q=Q(Y,v_s). \tag{7}$$

Because fluid velocity is zero at the wall of a conduit—whether open channel or full conduit—the function $Q(y,v_s)$ is of questionable value if $v_s$ is measured near the wall. In practice, the invention restricts single velocity measurement to a region where the fluid velocity is substantially different from zero.

A first embodiment of the present invention makes a linear approximation, articulating $Q(y,v_s)$ into the product of $v_s$ and $f(y)$ $$Q=v_s \cdot f(y). \tag{8}$$

Note that the dependence of Q on y is completely contained in f(y). The arrangement obviates determination of (1) channel flow area, and (2) mean flow velocity.

The level-discharge function f(y) is defined by $$f(y)=Q/v_s. \tag{9}$$

Figure 11:
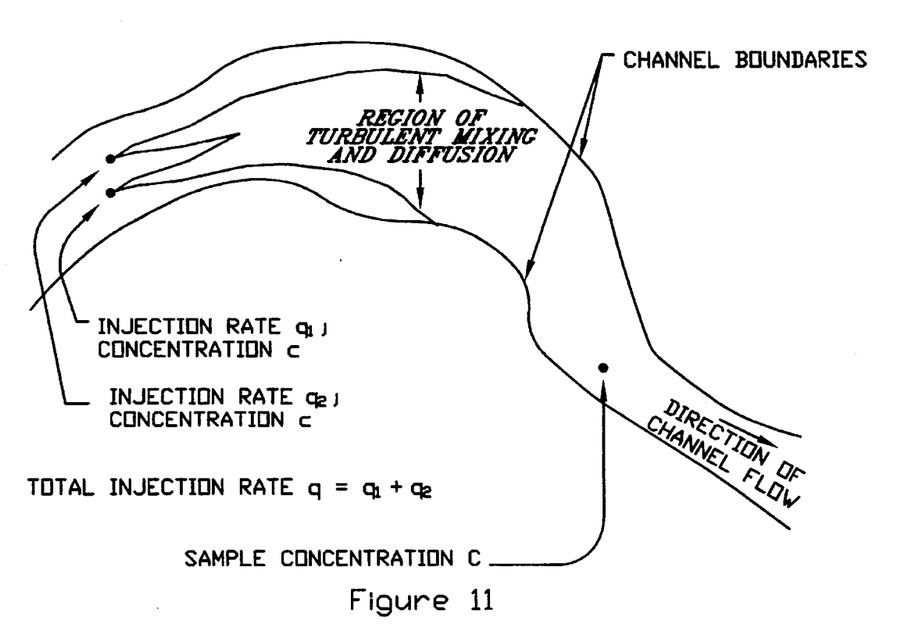
FIG. 11 is an illustration for explaining a method of determining discharge Q for generation of data for a look-up table according to the present invention.

For a given channel, a table of f(y) is initially generated from measurements of (1) discharge Q, (2) level y, and (3) single velocity $v_s$ measured at fixed elevation above the channel bottom. Level is measured by conventional means—sonic, bubbler, piezoelectric, etc. Single velocity measurement can be made with any of a number of standard techniques, such as a Price current meter, pitot tube, electromagnetic sensor, sonic sensor, laser sensor or other. For generating an f(y) table without need for area and mean velocity determination, use may be made of the tracer-dilution method illustrated in FIG. 11, which shows a simple method for determining discharge Q in order to form the f(y) table. FIG. 11 shows a tracer of concentration c injected into the flow stream at one or more points with collective injection rate of q. A sample is taken a sufficient length downstream from the injection point such that turbulent mixing in the stream yields a substantially uniform tracer concentration C. The discharge rate Q of the stream is then ascertained from the relationship $Q=c \cdot q/C$. The table for f(y), f(y,$v_s$) or f($v_s$) is then made up by use respectively of equation (9), or equation (6) or (20) discussed below.

After the table is constructed, stream discharge Q can be determined with the invention by measuring (1) level y, and (2) single velocity $v_s$. The level-discharge function f(y) is recalled from the table, so that Q is ascertained by rearrangement of equation (9)

$$Q=f \cdot v_s. \tag{10}$$

What we call the level-discharge function, as embodied in the f(y) table, has one independent variable, y; the dependent variable is f(y). For a given channel the table might look like Table 1.

TABLE 1

| y, feet | 9.47 | 11.39 | 14.14 | 16.21 | 20.79 | 21.35 |
|---|---|---|---|---|---|---|
| f(y), sq. ft. | 680 | 984 | 1516 | 1992 | 3277 | 3456 |

In a digital processor, access is made to the table, and multiplication with $v_s$ is carried out. Alternatively, one may use a function generator representing analytical or empirical functions in order to produce substantially the same data contained in the table.

In some instances, it may be a convenient implementation to articulate f(y) into a function of other functions of y $$f(y)=g(f_1(y), f_2(y), \ldots). \tag{11}$$

That is, it may sometimes be convenient to use several tables in finally arriving at the values for the table of the level-discharge function. We except from the definition of level-discharge function any requiring determination of channel area A, i.e., articulation with the explicit factor A(y)

$$f(y)=A(y) \cdot k, \tag{12}$$

where A is the cross-sectional area of the channel flow area.

If the table is sparse—as in Table 1—the invention provides a means for interpolating between tabulated values of y. This can be implemented in any one of a number of ways. For example, if the input to the level-discharge function generator is a digital signal, it may be that some number of the most significant bits would be used to address the look-up table and the remaining least significant bits would then be a measure of the relative position of the input signal between two consecutive look-up table addresses. These least significant bits could then be used to "pro-rate" the look-up table output between two consecutive ones of the discrete look-up table outputs. Obviously, the interpolation could be performed in a number of other ways well-known to those of skill in the art.

Alternatively, interpolation can be performed on the available data at the time of manufacturing the look-up table, so that no interpolation need be performed in real time during subsequent measurements.

Those who have investigated velocity profile try to use a velocity measuring instrument with fine spatial resolution—ideally to measure velocity at a point. The single velocity method usually strives for similar resolution; but it is not strictly necessary in implementing the present invention. Practically, measurement is made of velocity averaged over a volume-neighborhood of a point. A well focused laser velocimeter provides very high spatial resolution (small neighborhood). A Price meter or an electromagnetic velocity meter have larger neighborhoods.

All types of calibrated velocity meters can compare well when the meter is towed, at velocity $v_s$, through a quiescent fluid; fluid velocity and channel wall velocity are the same—zero—and there is no velocity profile. Hence, the fluid velocity encompassed by different sized neighborhoods is the same. But when the wall and velocity sensor are stationary while the fluid moves, wall friction sets up shear forces which cause a velocity profile. In that case meter comparison depends on the neighborhood size: a velocity meter affected substantially by flow throughout a small neighborhood does not encounter much velocity variation; but a meter affected by a large neighborhood encounters more sizeable velocity variation owing to velocity profile.

Therefore, for a given channel, the content of a table— as an embodiment of a level-discharge function—may depend on the velocity sensor employed. Since our purpose is to simplify velocity measurement to single velocity and thereafter to compensate for velocity profile, the present invention uses a velocity sensor whose signal substantially depends on fluid velocity in a neighborhood whose cross-sectional diameter is notably smaller than the cross-sectional diameter of the conduit. For arbitrary shape of cross-section, diameter is defined as the largest chord that may be drawn in the cross-section.

Velocity profile at a measuring station is influenced by flow entry conditions. If the flow entry conditions are sensibly different for forward and reverse flows, it may be necessary in a given installation to provide two level-discharge functions, respectively for forward and reverse flow.

For widest applicability, it is well to consider similitude and dimensional analysis. It is sometimes preferable to make dimensionless: (1) the discharge function, and (2) the argument of the discharge function (as shown in FIGS. 1 through 5). Equation (10) becomes $$Q = const \cdot v_o \cdot D^2 \cdot f(y/D) \cdot v_s/v_o, \quad (13)$$

where $D$ and $v_o$ are a length and velocity characteristic of the channel and fluid (similar to the characteristic length $D$ employed in the definition of Reynolds number, and similar to the friction velocity $v_o$ employed in velocity profile studies). Equation (6), described hereafter, becomes $$Q = const \cdot v_o \cdot D^2 \cdot f(y/D, \; v_s/v_o). \quad (14)$$

The const is needed to obtain Q in correct units of discharge. The invention includes means for normalizing $y$ and $v_s$, and for scaling discharge—as required.

Figure 6:
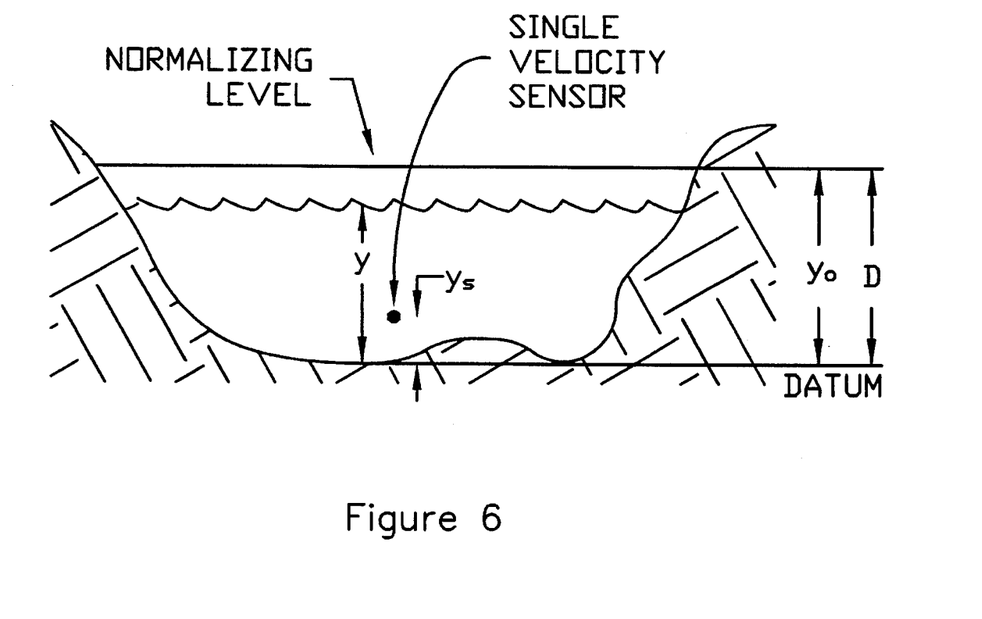
FIG. 6 is a diagram for explaining the operation of a single velocity flowmeter in a natural channel such as a river.
Figure 7:
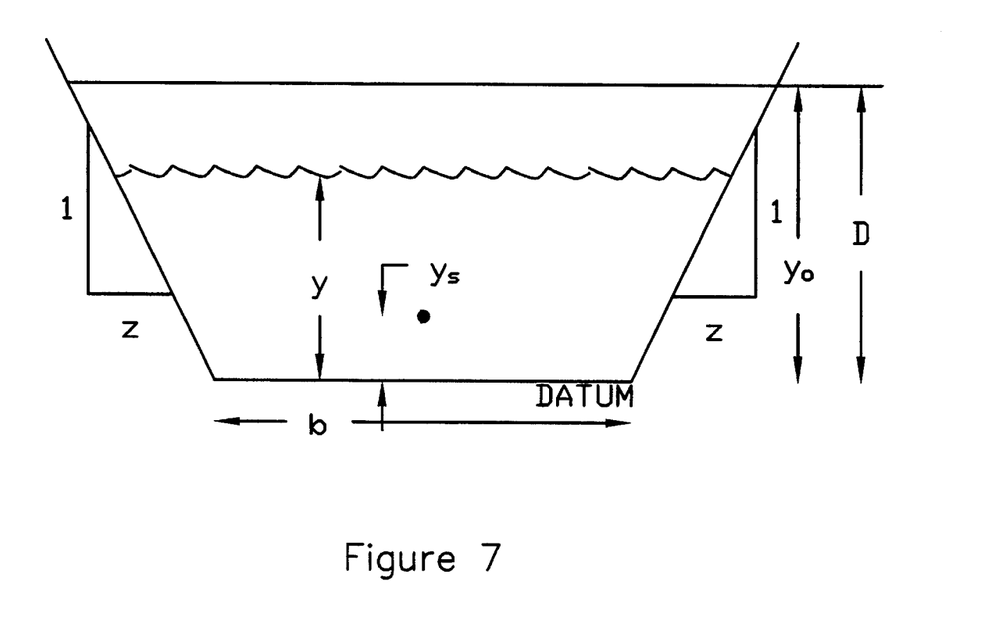
FIGS. 7 and 8 are diagrams for explaining the operation of a single velocity flowmeter in trapezoidal and circular artificial channel structures, respectively.
Figure 8:
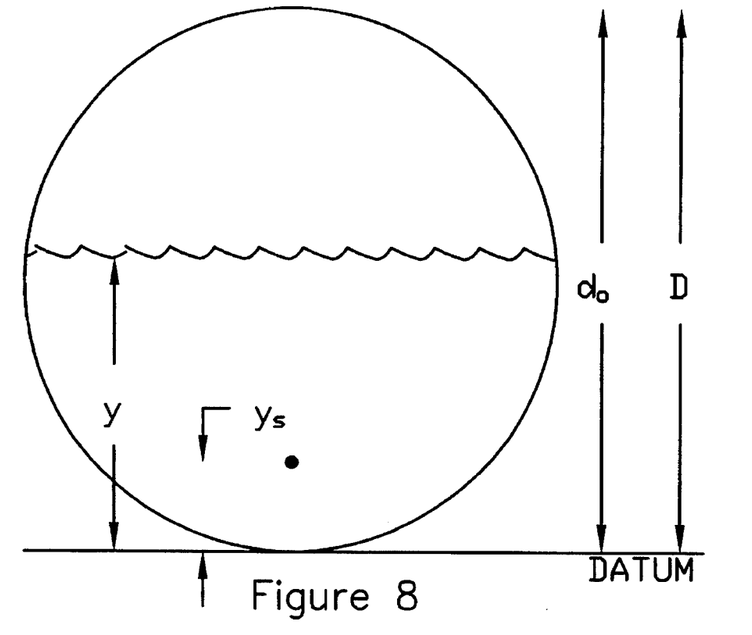

FIGS. 6 through 8 illustrate cross-sections of open channels that typically require discharge measurement. FIG. 6 is a natural channel such as a river, stream, or industrial or municipal ditch or unimproved canal. The characteristic length D may be some arbitrarily selected normalizing level $Y_o$ as shown. The datum for these measurements is arbitrary; we show the channel or conduit bottom as the datum.

FIGS. 7 and 8 illustrate channel artifices used in improved industrial and municipal canals and conduits. Municipalities and industries who need measurement of open-channel discharge are often forced to go to the expense of constructing these well-defined, prismatic artifices— only because present open-channel discharge measuring instruments require them in order to ease determination of the channel area function A(y/D) so as to maximize accuracy. In the circular and trapezoidal conduits, D may be equated with some arbitrarily selected normalizing level $y_o$; in the former, however, it is usually equated with pipe diameter $d_o$, as shown.

In FIGS. 6 through 8, we show the single velocity sensor $v_s$ at elevation $y_s$ above the bottom, and typically measuring near mid-channel. Generally, the discharge function f is a function of four variables for the level-discharge function $$f = f(x/D, y/D, x_s/D, y_s/D); \quad (15)$$

or of five variables for the level-velocity-discharge function $$f = f(x/D, y/D, x_s/D, y_s/D, v_s/v_o); \quad (16)$$

where y is the water depth (relative to the selected datum) at lateral horizontal position x in the channel, and $(x_s, y_s)$ is the location of the single velocity point. Generally, x and $x_s$ are selected to be near mid-channel. The velocity measurement elevation $y_s$ must be—especially for open channels—a judiciously selected compromise in a given application because: (1) velocity measurement at the bottom offers flow measurement capability for all flow levels, even the most shallow; but, (2) the velocity profile near the bottom (or near the wall for full conduit flow) is parabolic and hence relatively flat and subject to fluctuations owing to bottom (or wall) roughness of the channel. A best compromise is to make the single velocity measurement at some fixed distance above the bottom. In a given application, x, $x_s$ and $y_s$ are fixed, and for simplicity we simply write f as a function of one dimensionless variable, y/D, for the level-discharge function; of y/D and $v_s/v_o$ for the level-velocity-discharge function; and of $v_s/v_o$ for the velocity-discharge function.

The analog function generator, in a digital implementation, is simply a look-up table addressed by the processor. Whether analog or digital, the function generator is the means for storing a predetermined set of discharge function data as a function of fluid height.

Figure 3:
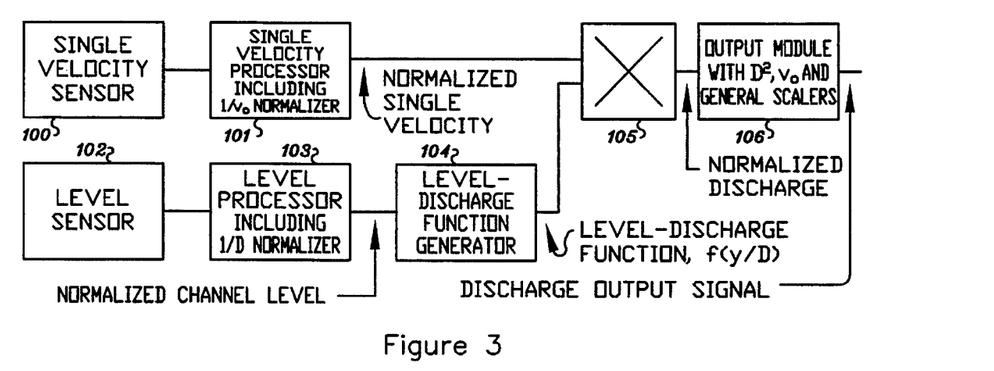
FIG. 3 is a block diagram of a first embodiment of the present invention.

A block diagram of a preferred form of the first embodiment of the present invention is shown in FIG. 3. All processors may, of course, be analog or digital or a mix. The level gauge processor 103 includes a $D^{-1}$ normalizer. The output of processor 103 is the input to the level-discharge function generator 104. The function generator output is one of the inputs to the multiplier 105. The single velocity sensor 100 has its own processor 101—to discriminate against noise and to provide an output that is proportional to the fluid velocity at the single point (it may contain its own linearizing function generator, e.g., when the transducer is a non-linear element such as a pitot-tube sensor), and may contain $1/v_o$ normalizing. The output of processor 101 is the second input to the multiplier 105. The multiplier output is input to an output module 106 which includes the $D^2$ scaler and general scaling, as described below. The output module 106, whether analog or digital, provides output impedances adequate to drive transmission lines and controls, and may also incorporate a visual indication of the discharge Q.

The block diagram in FIG. 3 shows what may generally be called scalers, although the first two achieve normalization by dividing by suitable quantities while the last multiplies to scale the normalized discharge to actual discharge:
(1) $D^{-1}$ (normalizer, within module 103) at the output of the level gauge 102 (often incorporated in marketed level gauges);
(2) $1/v_o$ (normalizer, within module 101) at the output of the velocity gauge 100;
(3) $D^2$ (within module 106) at the output of the multiplier 105. Clearly, if convenience dictates this scaler could equally well be placed at either input to the multiplier; and
(4) a general scaler (also within module 106). The general scaler may be used to yield output in different units of discharge (e.g., cubic feet per second, acre-feet per day, etc.). Also, it may be needed if it is desirable to normalize f(y/D) such that f(1)= 1, in which case a constant multiplier may be needed. Further, other scalers may be needed throughout the processor to assure that signal levels do not exceed acceptable levels at various stages.

While normalizing and scaling are generally useful, they are not absolutely necessary; the invention can be operated without normalizing and scaling.

There may be applications where the velocity profile is such that it would be preferable to use a plurality of sensors to make simultaneous measurements of velocity and to take a weighted average of the sensor outputs. In such a case, what is indicated as single velocity in FIGS. 3 through 5 would instead be a weighted average of a few single velocities. However, the overall collective neighborhood of the plurality of sensors has a diameter that is notably smaller than the diameter of the conduit. For example, if unusual velocity profile conditions exist, e.g., after passing a bend in a pipe, circumstances may warrant the use of two or three velocity sensors.

A second embodiment of the invention recalls equation (7), but notes that velocity profile depends on Reynolds number of the flow, i.e., effectively depends on $v_s$. Hence the approximation linear in $v_s$—as in equation (8)— does not give best accuracy. Instead, we must use what will be defined as a level-velocity-discharge function, embodied in level-velocity-discharge table, representing the form $$Q = f(y, v_s),  \qquad (17)$$

Table 2 is a level-velocity-discharge table, an augmentation of Table 1, to provide for nonlinearity in $v_s$.

TABLE 2

| $v_s$, fps | f(y, $v_s$), cubic feet per second | | | | | |
|---|---|---|---|---|---|---|
| 0.75 | 18.9 | 25.0 | 35.5 | 42.3 | 61.6 | 64.1 |
| 0.95 | 27.0 | 35.6 | 49.2 | 60.4 | 87.8 | 91.3 |
| 1.11 | 34.1 | 45.0 | 62.2 | 76.3 | 110.9 | 115.4 |
| 1.22 | 39.3 | 51.8 | 71.6 | 87.9 | 127.7 | 132.9 |
| 1.36 | 46.2 | 61.0 | 84.3 | 103.5 | 150.3 | 156.5 |
| 1.72 | NA | 86.7 | 119.9 | 147.2 | 213.8 | 222.5 |
| 1.85 | NA | NA | 96.7 | 164.2 | 238.5 | 248.2 |
| 2.22 | NA | NA | NA | 215.9 | 313.6 | 326.3 |

For the physical parameters of the channel of Table 2, it may not be possible to have certain combinations of y and $v_s$; impossible entries are shown as NA.

When the table of $f(y,v_s)$ has the two independent variables y and $v_s$, we define the discharge function, of which Table 2 is an embodiment, as a level-velocity-discharge function. As with the level-discharge function, it can be implemented by a function generator, empirical functions and the like.

In some applications it may be helpful to articulate $f(y,v_s)$ into other functions of y and $v_s$ $$f(y,v_s) = g(f_1(y,v_s), f_2(y,v_s), \ldots).  \qquad (18)$$

Excepted from the definition of level-velocity-discharge function is any articulation that expressly has $v_s$ as a factor $$f(y,v_s) = g(y) \cdot v_s,  \qquad (18a)$$

where g(y) is not—as indicated—a function of $v_s$.

As with the level-discharge function, the invention can provide an interpolating means.

Figure 10:
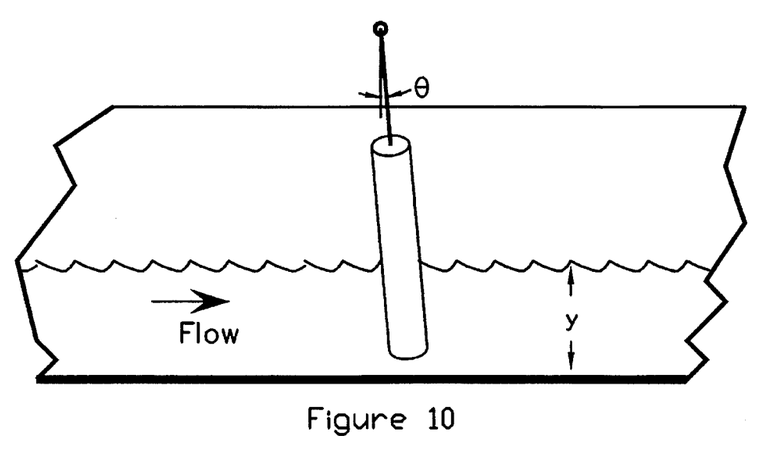
FIG. 10 illustrates a drogue type velocity sensor in an open channel.

The level-velocity-discharge function of the second embodiment of the invention can do more than compensate for velocity profile in the channel. It can compensate for nonlinearities in the velocity measuring device itself. FIG. 10 shows a rudimentary drogue type of velocity sensor whose deflection θ is a nonlinear function of velocity $v_s$ and also of the level y. However, since deflection is a repeatable, monotonic function of $v_s$ and y, the level-velocity-discharge function—derived from prior measurements of discharge Q, via use of equation (6)— yields correct discharge.

FIG. 6 shows use of a single velocity flowmeter in a natural channel such as a river. FIGS. 7 and 8 show application to artificial channel structures—trapezoidal and circular.

Figure 4:
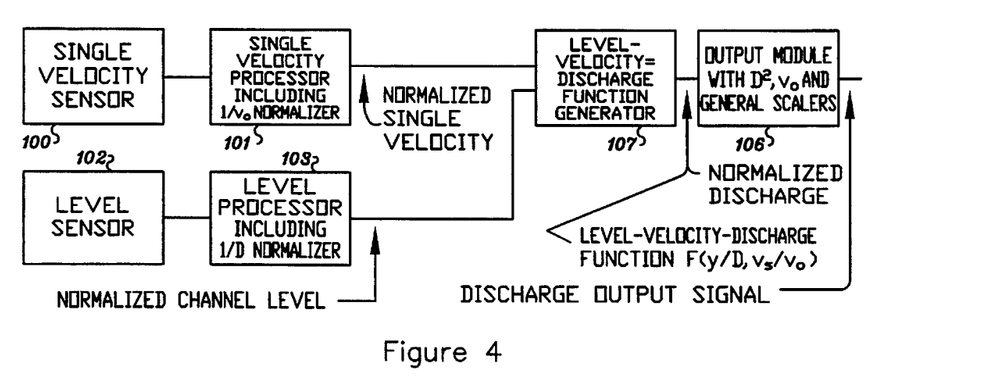
FIG. 4 is a block diagram of a second embodiment of the present invention.

Operation for the second embodiment of the invention is seen by reference to the block diagram of FIG. 4. Here, the level-discharge function generator is replaced by a level-velocity-discharge function generator 107. Its inputs are the outputs of the velocity processor 101 and the level processor 103. No multiplier is employed. The output of the level-velocity-discharge function generator is the normalized discharge.

Figure 9:
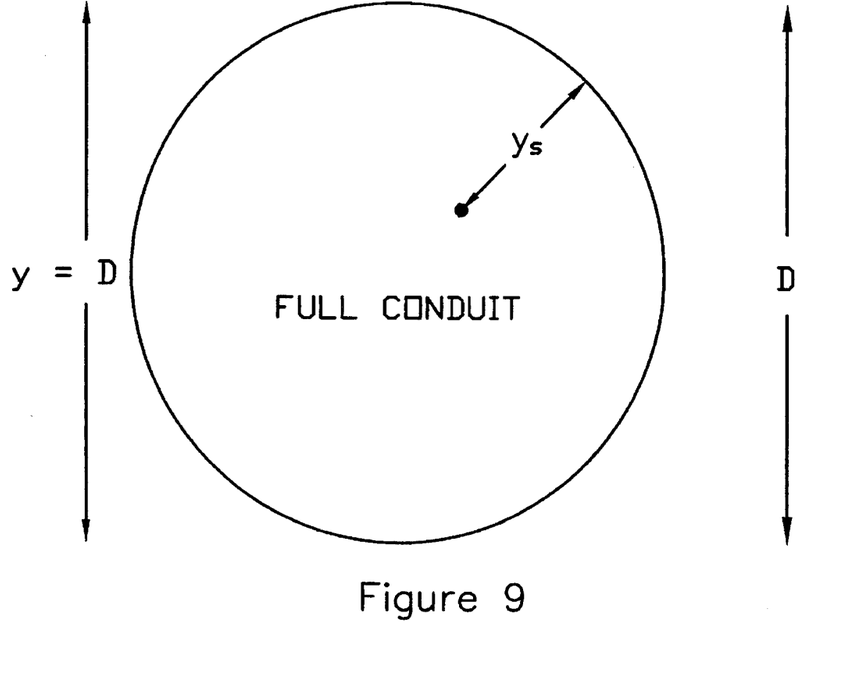
FIG. 9 is a diagram for explaining the operation of a single velocity flowmeter in a full conduit.

A third embodiment of the invention derives when level y reaches its maximum in a closed conduit. For example, in a circular pipe the argument y/D of the discharge function in equation (14) reaches unity—as depicted in FIG. 9— and $$Q = const \cdot v_o \cdot D^2 \cdot f(1, v_s/v_o)  \qquad (19)$$

Under these conditions, $f(1,v_s,v_o)$ corrects for variation in velocity profile—as a function of single velocity $v_s$— in a full conduit so as to yield discharge Q. For this third embodiment we may suppress the constant value of y/D and write simply $$Q = const \cdot v_o \cdot D^2 \cdot f(v_s/v_o).  \qquad (20)$$

Its tabular form might look—with dimensionless parameters—like Table 3.

TABLE 3

| $v_s/v_o$ | −0.50 | 0.00 | 0.50 | 1.00 | 1.50 | 2.00 |
|---|---|---|---|---|---|---|
| $f(v_s/v_o)$ | −85 | 0 | 100 | 216 | 335 | 459 |

Table 3 shows an embodiment of what we define to be a velocity-discharge function.

FIG. 9 recognizes that, in a full conduit, gravity (and the direction of the gravity vector) plays no role in velocity profile. The single velocity measurement neighborhood may be placed virtually arbitrarily within the conduit.

The velocity-discharge function $f(v_s)$ can be articulated in other forms if convenient $$f(v_s) = g(f_1(v_s), f_2(v_s), \ldots).  \qquad (21)$$

Since our purpose is to use single velocity as measured in the neighborhood of a point, a common articulation might be in the form of $g(v_s)$, the coefficient of single velocity $v_s$ $$f(v_s) = v_s \cdot g(v_s).  \qquad (22)$$

The velocity-discharge function can be represented not only in tabular form, but also as a function generator based upon analytical or empirical functions.

As before, this embodiment of the invention can provide interpolating, normalizing and scaling means.

Figure 5:
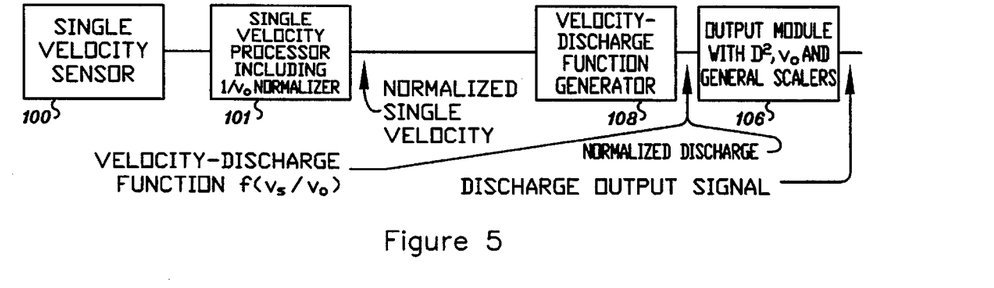
FIG. 5 is a block diagram of a third embodiment of the present invention.

Operation of the third embodiment of the invention is shown in FIG. 5. The single input to the velocity-discharge function generator 108 is the output of the velocity processor 101. No level gauge is used. No multiplier is used. The output of the velocity-discharge function generator is the normalized discharge.

I claim:

1. An apparatus for measuring the discharge of a fluid in an open channel, comprising:

a velocity measuring device which measures velocity of the fluid in the neighborhood of at least one fixed point and produces a corresponding fluid velocity signal value;

a level measuring device which measures the height of said fluid at a predetermined location in said channel and produces a corresponding fluid level signal value;

a level-discharge function generator which receives said fluid level signal value and in response generates a level-discharge function of the form $f(y)=Q/v_p$, where y is said height of said fluid, Q is said volumetric discharge and $v_p$ is said measured velocity; and a multiplication circuit which multiplies the fluid velocity signal by said level-discharge function to obtain a discharge signal representing volumetric discharge 2. An apparatus according to claim 1, wherein said velocity measuring device measures fluid velocity in the neighborhood of only a single fixed point.

3. An apparatus according to claim 1, further comprising scaling means for scaling said fluid velocity signal, said fluid level signal and said discharge signal.

4. An apparatus according to claim 1, wherein said level-discharge function generator includes a circuit which provides one of a plurality of discrete output values, and further includes an interpolation circuit which is responsive to at least a portion of the fluid level signal and generates an output as said level-discharge function which has a value between two adjacent ones of said discrete output values.

5. An apparatus according to claim 1, wherein the level-discharge function generator and the multiplier generate said level-discharge function and obtain said discharge signal without determining cross-sectional area of said channel.

6. An apparatus according to claim 1, wherein said level-discharge function generator comprises means for generating said level-discharge function in accordance with data obtained in advance and relating volumetric discharge to sensed point velocity for various fluid levels.

7. An apparatus according to claim 6, wherein said level-discharge function generator comprises a look-up table accessed by a signal representing said fluid level and storing data relating volumetric discharge to sensed point velocity for various fluid levels.

8. An apparatus for measuring the discharge of a fluid in an open channel, comprising:

a velocity measuring device which measures velocity of the fluid in the neighborhood of at least one fixed point and produces a corresponding fluid velocity signal value;

a level measuring device which measures the height of said fluid at a predetermined location in said channel and produces a corresponding fluid level signal value; and a level-velocity-discharge function generator which receives both said fluid level signal value fluid velocity signal value and in response generates a level-velocity-discharge function to obtain a discharge signal representing volumetric flowrate, wherein said level-velocity-discharge function is a non-linear function of said fluid velocity signal value.

9. An apparatus according to claim 8, wherein said velocity measuring device measures fluid velocity in the neighborhood of only a single fixed point.

10. An apparatus according to claim 8, further comprising scaling means for scaling said fluid velocity signal, said fluid level signal and said discharge signal.

11. An apparatus according to claim 8, wherein said level-velocity-discharge function generator includes a circuit which provides one of a plurality of discrete output values, and further includes an interpolation circuit which is responsive to at least a portion of the fluid level signal and generates an output as said level-velocity-function which has a value between two adjacent ones of said discrete output values.

12. An apparatus according to claim 8, wherein the level-velocity-discharge function generator generates said level-velocity-function without determining cross-sectional area of said channel.

13. An apparatus according to claim 8, wherein said level-velocity-discharge function generator comprises means for generating said level-velocity-discharge function in accordance with data obtained in advance and relating volumetric discharge to sensed point velocity for various fluid levels.

14. An apparatus according to claim 13, wherein said level-velocity-discharge function generator comprises a look-up table accessed by a combination of said fluid level signal value and said fluid velocity signal value and storing data relating volumetric discharge to sensed point velocity for various fluid levels.

15. An apparatus for measuring the discharge of a fluid in a conduit, comprising:

a velocity measuring device which measures fluid velocity in the neighborhood of at least one fixed point and produces a corresponding fluid velocity signal value; and a velocity-discharge function generator which receives at least said fluid velocity signal value and in response generates a discharge signal which is a function of at least said velocity signal and represents volumetric flowrate, wherein said function differs for different values of said velocity signal.

16. An apparatus according to claim 15, wherein said velocity measuring device measures fluid velocity in the neighborhood of only a single fixed point.

17. An apparatus according to claim 15, wherein said velocity measuring device measures fluid velocity in the neighborhood of two fixed points.

18. An apparatus according to claim 15, wherein said velocity measuring device measures fluid velocity in the neighborhood of three fixed points.

19. An apparatus according to claim 15, further comprising scaling means for scaling said fluid velocity signal and said discharge signal.

20. An apparatus according to claim 15, wherein said velocity-discharge function generator includes a circuit which provides one of a plurality of discrete output values, and further includes an interpolation circuit which is responsive to at least a portion of the fluid velocity signal and generates an output as said discharge signal which has a value between two adjacent ones of said discrete output values.

21. An apparatus according to claim 15, wherein said velocity-discharge function generator comprises means for generating said discharge signal in accordance with data obtained in advance and relating volumetric discharge to sensed point velocity.

22. An apparatus according to claim 21, wherein said velocity-discharge function generator comprises a look-up table accessed by said fluid velocity signal value and storing data relating volumetric discharge to sensed point velocity.

* * * * *